United States Patent
Takamoto

(10) Patent No.: US 10,489,093 B2
(45) Date of Patent: Nov. 26, 2019

(54) SERVER, CONTROL METHOD OF SERVER, AND NETWORK SYSTEM

(71) Applicant: SEIKO EPSON CORPORATION, Tokyo (JP)

(72) Inventor: Akio Takamoto, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/718,718

(22) Filed: Sep. 28, 2017

(65) Prior Publication Data

US 2018/0088871 A1 Mar. 29, 2018

(51) Int. Cl.
*G06F 3/12* (2006.01)
*H04N 1/00* (2006.01)

(52) U.S. Cl.
CPC ............ *G06F 3/123* (2013.01); *G06F 3/1204* (2013.01); *G06F 3/1224* (2013.01); *G06F 3/1231* (2013.01); *G06F 3/1285* (2013.01); *G06F 3/1287* (2013.01); *G06F 3/1294* (2013.01); *H04N 1/00* (2013.01)

(58) Field of Classification Search
CPC ...... G06F 3/123; G06F 3/1224; G06F 3/1231; G06F 3/1287; G06F 3/1225; G06F 3/1285; H04N 1/00; H04N 2005/4437
See application file for complete search history.

(56) References Cited

U.S. PATENT DOCUMENTS

| | | | | |
|---|---|---|---|---|
| 2004/0003056 | A1* | 1/2004 | Yamaguchi | G06F 16/40 709/219 |
| 2004/0236828 | A1* | 11/2004 | Igeta | H04N 1/32101 709/203 |
| 2006/0031186 | A1* | 2/2006 | Yokokura | G06F 9/5055 |
| 2006/0080653 | A1* | 4/2006 | Siwatu | G06F 8/61 717/173 |
| 2009/0150878 | A1* | 6/2009 | Pathak | G06F 8/65 717/172 |
| 2009/0235244 | A1 | 9/2009 | Enomori et al. | |
| 2012/0062944 | A1* | 3/2012 | Nakamoto | G06F 8/654 358/1.15 |
| 2012/0084767 | A1* | 4/2012 | Ishimoto | G06F 8/65 717/173 |
| 2012/0246221 | A1* | 9/2012 | Miyawaki | G06F 21/6236 709/203 |
| 2013/0262600 | A1* | 10/2013 | Ishida | H04L 51/00 709/206 |

(Continued)

FOREIGN PATENT DOCUMENTS

| | | |
|---|---|---|
| JP | 2008-146152 A | 6/2008 |
| JP | 2009-217656 A | 9/2009 |

(Continued)

*Primary Examiner* — Moustapha Diaby
(74) *Attorney, Agent, or Firm* — Foley & Lardner LLP

(57) ABSTRACT

Disclosed is a server unit connectable to a printing apparatus, the server unit being configured to: receive printing apparatus information from the printing apparatus and transmit an address which designates a storage location of overwriting firmware to the printing apparatus in a case where a predetermined condition is satisfied; and transmit the overwriting firmware to the printing apparatus in a case where a request of transmission of the overwriting firmware based on the address is received from the printing apparatus.

6 Claims, 8 Drawing Sheets

(56) References Cited

U.S. PATENT DOCUMENTS

| | | |
|---|---|---|
| 2014/0025974 A1 | 1/2014 | Suwabe |
| 2014/0282481 A1* | 9/2014 | Ohara ................... G06F 8/65 717/172 |
| 2015/0043029 A1* | 2/2015 | Tsuboi .................. G06F 3/123 358/1.15 |
| 2017/0078512 A1* | 3/2017 | Mochizuki .......... H04L 41/5074 |

FOREIGN PATENT DOCUMENTS

| | | |
|---|---|---|
| JP | 2012-203719 A | 10/2012 |
| JP | 2014-021678 A | 2/2014 |
| JP | 2016-024775 A | 2/2016 |

\* cited by examiner

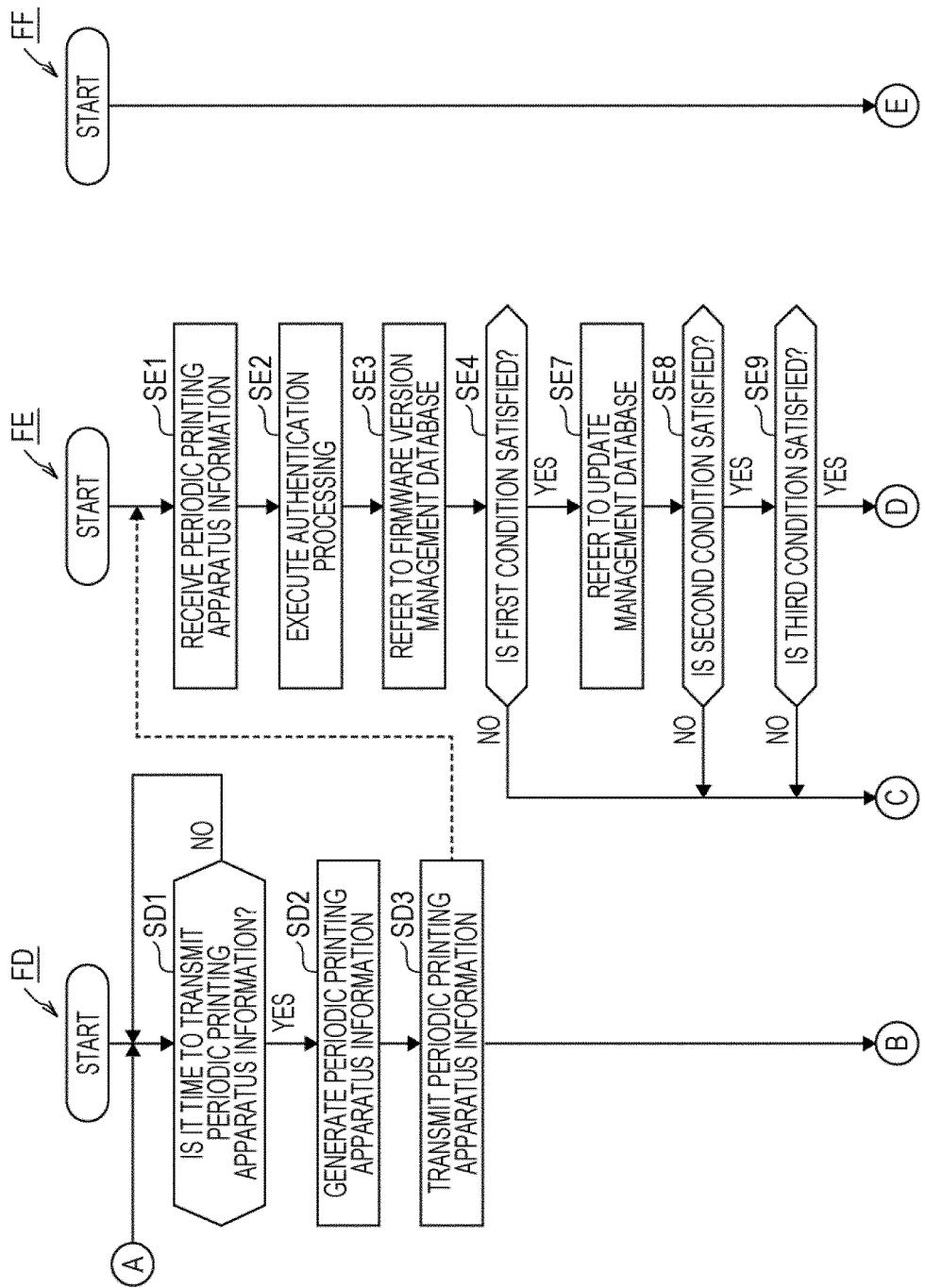

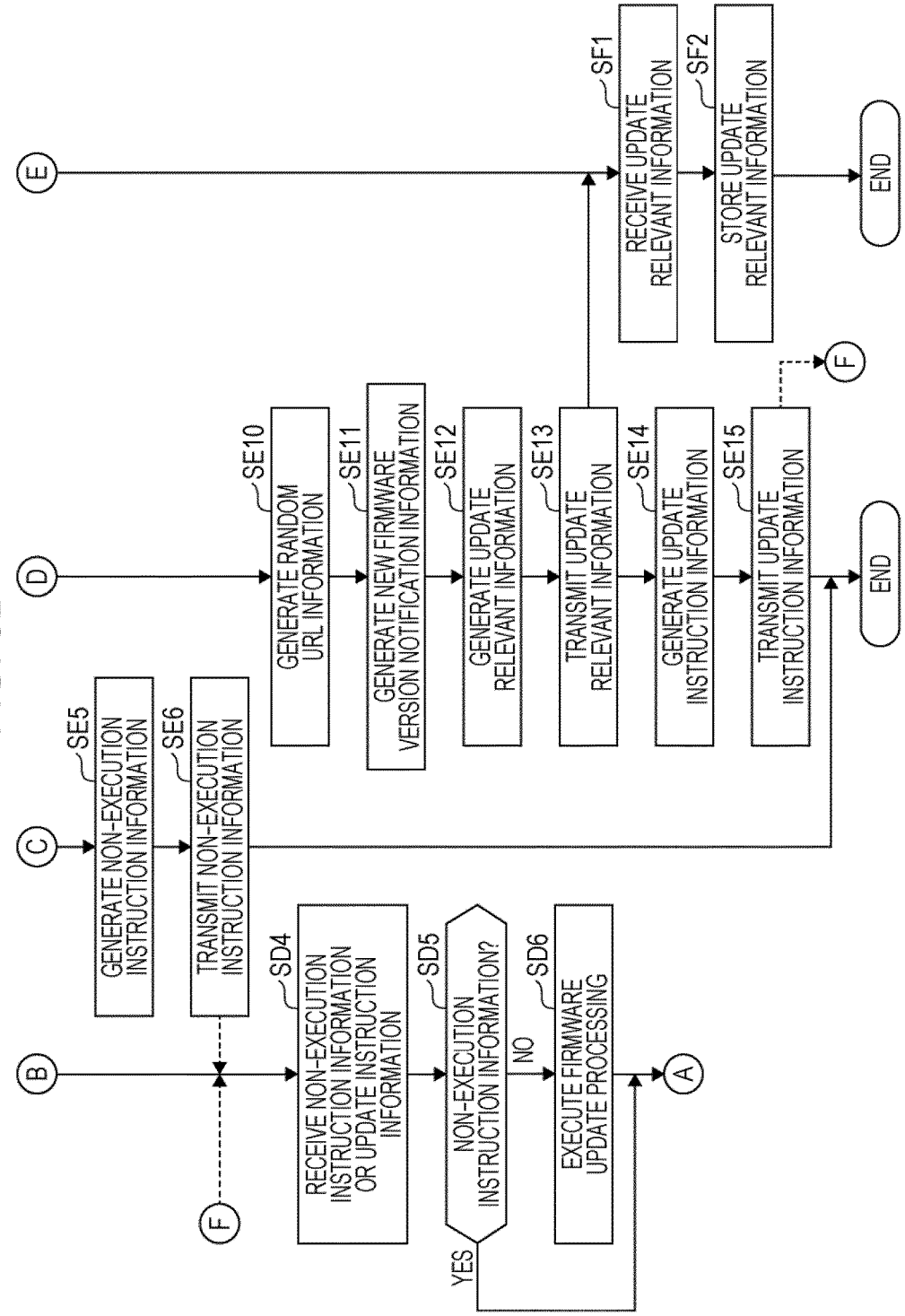

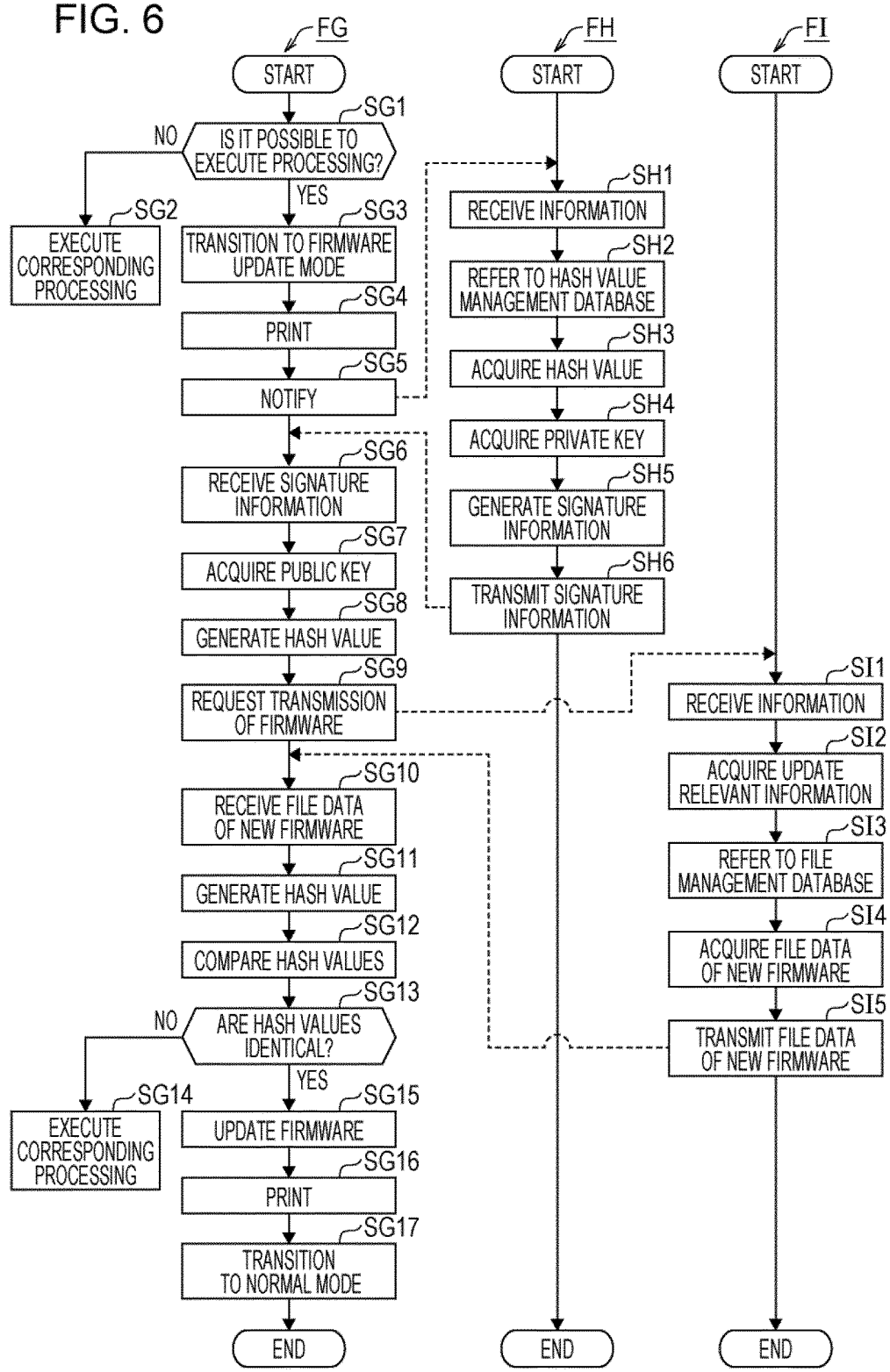

FIG. 7

FIRMWARE UPDATE IS STARTED.

YOU WILL BE NOTIFIED WHEN FIRMWARE UPDATE IS COMPLETED.

PLEASE DO NOT TURN OFF PRINTER UNTIL FIRMWARE UPDATE IS COMPLETED.

FIG. 8

FIRMWARE UPDATE IS COMPLETED.

PLEASE RESTART PRINTER.

SERVER, CONTROL METHOD OF SERVER, AND NETWORK SYSTEM

BACKGROUND

1. Technical Field

The present invention relates to a server, a control method of a server, and a network system.

2. Related Art

In the related art, a server (external server 250) that communicates with a printing apparatus (information processing apparatus 100) and transmits an overwriting file of firmware to the printing apparatus, is known (for example, refer to JP-A-2016-24775).

As in the server described above, in a server that communicates with a printing apparatus and transmits an overwriting file of firmware to the printing apparatus, there is a need to make it possible to transmit the overwriting file of firmware to the printing apparatus in an appropriate method using communication with the printing apparatus.

SUMMARY

An advantage of some aspects of the invention is to provide a server and a network system including the server that can transmit the overwriting firmware to the printing apparatus in an appropriate method using communication with the printing apparatus, the server communicating with the printing apparatus and transmitting the overwriting firmware of firmware to the printing apparatus.

According to an aspect of the invention, there is provided a server connectable to a printing apparatus, the server being configured to: receive printing apparatus information from the printing apparatus, and transmit an address which designates a storage location of overwriting firmware of firmware to the printing apparatus in a case where a predetermined condition is satisfied; and transmit the overwriting firmware to the printing apparatus in a case where a request of transmission of the overwriting firmware based on the address is received from the printing apparatus.

According to this configuration of the aspect of the invention, in a case where the predetermined condition is not satisfied, the server can prevent the printing apparatus from acquiring the address which designates the storage location of the file data of the new firmware. In addition, the server can control whether or not to permit overwriting of the firmware of the printing apparatus, and control an execution timing of processing related to overwriting. That is, according to this embodiment, the server transmits the overwriting firmware of firmware to the printing apparatus by communicating with the printing apparatus. Thus, the server can transmit the overwriting firmware to the printing apparatus in an appropriate method using communication with the printing apparatus.

In addition, in the aspect of the invention, the printing apparatus information may include model information indicating a model of the printing apparatus and version information indicating a version of the firmware, and the server may determine whether or not the predetermined condition is satisfied based on the model information and the version information which are received from the printing apparatus.

According to this configuration of the aspect of the invention, the server can appropriately determine whether or not overwriting of the firmware is necessary in the printing apparatus, based on the model of the printing apparatus and the version of the firmware.

In addition, in the aspect of the invention, the printing apparatus information may include identification information for identifying the printing apparatus, and the server may determine whether or not the predetermined condition is satisfied based on the identification information received from the printing apparatus.

According to this configuration of the aspect of the invention, the server can appropriately determine whether or not overwriting of the firmware is necessary in the printing apparatus, based on specific circumstances of the printing apparatus, using the identification information of the printing apparatus.

In addition, in the aspect of the invention, the server may determine whether or not the predetermined condition is satisfied, based on whether or not the printing apparatus is in a time period during which the printing apparatus can execute overwriting of the firmware.

According to this configuration of the aspect of the invention, the server can cause the printing apparatus to execute processing related to overwriting of the firmware in the time period during which overwriting of the firmware can be executed.

In addition, in the aspect of the invention, the time period during which the printing apparatus can execute overwriting of the firmware may be a time period during which the printing apparatus does not execute printing.

According to this configuration of the aspect of the invention, the server can cause the printing apparatus to execute processing related to overwriting of the firmware in the time period during which the printing apparatus does not execute printing.

In addition, in the aspect of the invention, the server may be configured to include a first server, a second server, and a third server, the first server may transmit an address of the second server according to an access from the printing apparatus, the second server may transmit an address which designates a storage location of the overwriting firmware in the third server based on the access from the printing apparatus in a case where a predetermined condition is satisfied, and the third server may transmit the overwriting firmware to the printing apparatus based on the access from the printing apparatus.

According to this configuration of the aspect of the invention, based on the fact that the server is configured to include the first server, the second server, and the third server, by allocating functions to each server, it is possible to distribute the load of each server and reduce the data amount of data stored in each server.

In addition, in the aspect of the invention, the first server may generate a password to be used for accessing the second server when transmitting the address of the second server, and transmit the password to the printing apparatus and the second server.

According to this configuration of the aspect of the invention, the server can authenticate the printing apparatus based on the password generated by the first server.

In addition, in the aspect of the invention, the second server may randomly generate an address which designates a storage location of the overwriting firmware in the third server, and transmit the address to the printing apparatus and the third server.

According to this configuration of the aspect of the invention, it is possible to prevent an apparatus other than the valid printing apparatus that receives the random address, from accessing the third server and acquiring the overwriting firmware.

Further, according to another aspect of the invention, there is provided a control method of a server connectable to a printing apparatus, the method including: receiving printing apparatus information from the printing apparatus, and transmitting an address which designates a storage location of overwriting firmware of firmware to the printing apparatus in a case where a predetermined condition is satisfied; and transmitting the overwriting firmware to the printing apparatus in a case where a request of transmission of the overwriting firmware based on the address is received from the printing apparatus.

According to this configuration of the aspect of the invention, in a case where the predetermined condition is not satisfied, the server can prevent the printing apparatus from acquiring the address which designates the storage location of the file data of the new firmware. In addition, the server can control whether or not to permit overwriting of the firmware of the printing apparatus, and control an execution timing of processing related to overwriting. That is, according to this embodiment, the server transmits the overwriting firmware of firmware to the printing apparatus by communicating with the printing apparatus. Thus, the server can transmit the overwriting firmware to the printing apparatus in an appropriate method using communication with the printing apparatus.

Furthermore, according to still another aspect of the invention, there is provided a network system including a printing apparatus and a server connectable to the printing apparatus, in which the printing apparatus transmits printing apparatus information to the server, in which the server receives the printing apparatus information from the printing apparatus, and transmits an address which designates a storage location of overwriting firmware of firmware to the printing apparatus in a case where a predetermined condition is satisfied, in which the printing apparatus receives the address, and transmits a request of transmission of the overwriting firmware based on the received address, and in which the server transmits the overwriting firmware to the printing apparatus in a case where the request of transmission of the overwriting firmware is received from the printing apparatus.

According to this configuration of the aspect of the invention, in the network system, in a case where the predetermined condition is not satisfied, the server can prevent the printing apparatus from acquiring the address which designates the storage location of the file data of the new firmware. In addition, the server can control whether or not to permit overwriting of the firmware of the printing apparatus, and control an execution timing of processing related to overwriting. That is, according to this embodiment, in the network system including the server that transmits the overwriting firmware of firmware to the printing apparatus by communicating with the printing apparatus, the server can transmit the overwriting firmware to the printing apparatus in an appropriate method using communication with the printing apparatus.

BRIEF DESCRIPTION OF THE DRAWINGS

The invention will be described with reference to the accompanying drawings, wherein like numbers reference like elements.

FIGS. 5A and 5B are flowcharts illustrating operations of the printing apparatus, the management server, and a file providing server.

FIG. 6 is a flowchart illustrating operations of the printing apparatus, the management server, and the file providing server.

FIG. 7 is a diagram illustrating an example of information printed on roll paper.

FIG. 8 is a diagram illustrating an example of information printed on roll paper.

DESCRIPTION OF EXEMPLARY EMBODIMENTS

Hereinafter, an embodiment according to the invention will be described with reference to the drawings.

Figure 1:
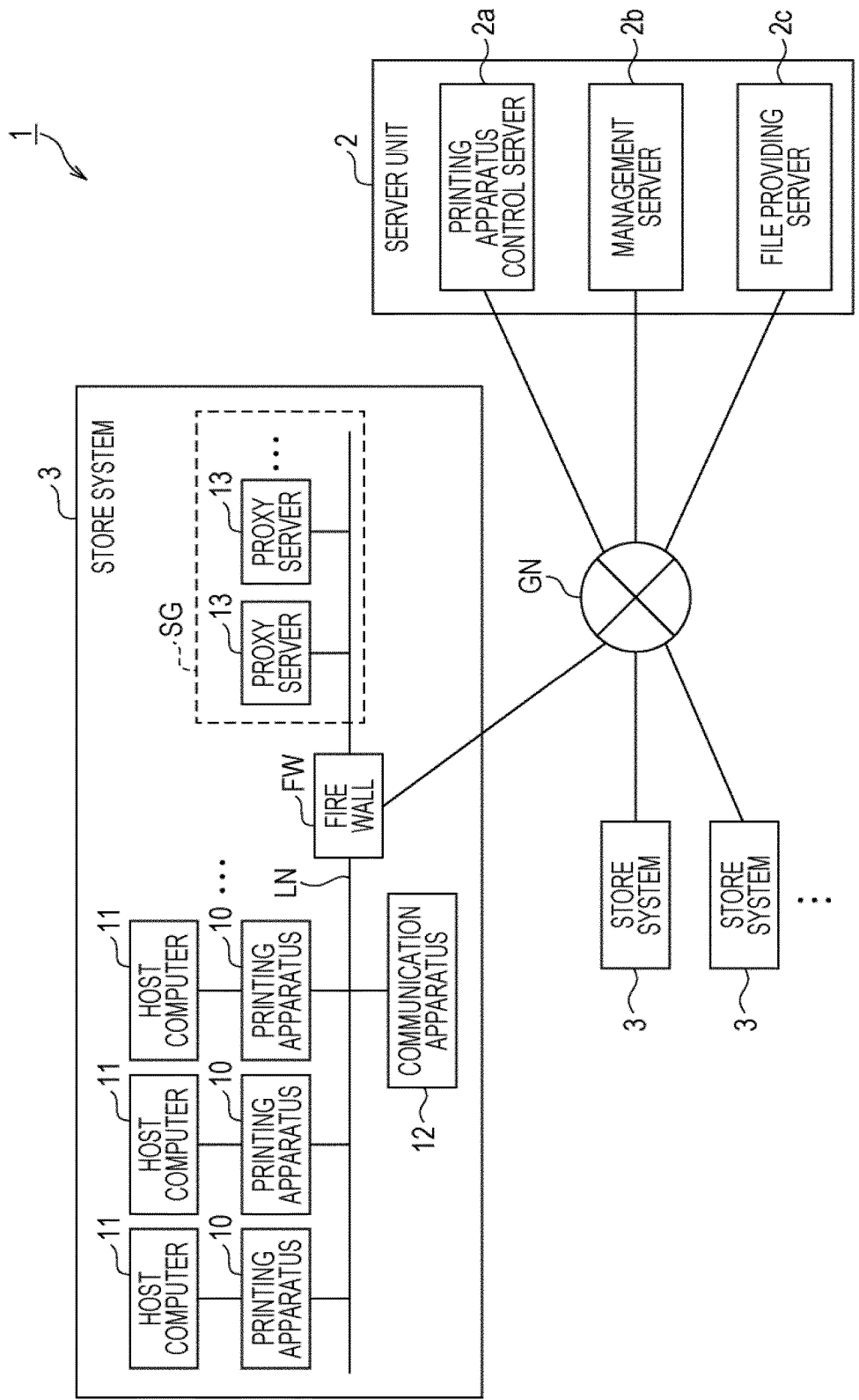
FIG. 1 is a diagram illustrating a configuration of a network system according to the present embodiment.

FIG. 1 is a diagram illustrating a configuration of a network system 1 according to the embodiment.

As illustrating in FIG. 1, the network system 1 includes a server unit 2 (server) and a plurality of store systems 3. The server unit 2 is configured to include a printing apparatus control server 2a (first server), a management server 2b (second server), and a file providing server 2c (third server). In the network system 1, the server unit 2 and each of the store systems 3 are connected to each other so as to communicate with each other via a global network GN which is configured to include the Internet and other networks.

Configurations and functions of the printing apparatus control server 2a, the management server 2b, and the file providing server 2c will be described later.

In FIG. 1, although each of the printing apparatus control server 2a, the management server 2b, and the file providing server 2c is expressed by one block, this does not mean that each of the servers is configured with a single server apparatus. For example, the printing apparatus control server 2a may be configured to include a plurality of server apparatuses.

The store system 3 is a system provided in a store such as a supermarket, a convenience store, a department store, or a restaurant at which merchandise, a service, or the like is provided and accounting is performed according to the provision.

As illustrated in FIG. 1, the store system 3 includes a local network LN. One or a plurality of printing apparatuses 10, one or a plurality of host computers 11 corresponding to each of the printing apparatuses 10, and a communication apparatus 12 are connected to the local network LN.

The communication apparatus 12 is an interface apparatus that connects the local network LN and the global network GN. The communication apparatus 12 has a function as a modem (or an optical network unit (ONU)), a function as a router, a network address translation (NAT) function, a function as a dynamic host configuration protocol (DHCP) server, and the like. The communication apparatus 12 transfers data which is transmitted and received between an apparatus connected to the local network LN and an apparatus connected to the global network GN when communication is performed between the apparatuses. In FIG. 1, although the communication apparatus 12 is represented by one block, the communication apparatus 12 may be configured to include a plurality of apparatuses according to the function.

As illustrated in FIG. 1, proxy servers 13 provided in a demilitarized zone (DMZ) segment SG are connected to the local network LN via a fire wall FW. The proxy server 13 is configured to include a relay server, a DNS server, a web server, or the like. Illegal access from the global network GN to the apparatus connected to the local network LN is prevented by functions of the firewall FW and the proxy server 13 provided in the DMZ segment SG.

The printing apparatus 10 and the host computer 11 are provided at a checkout counter at which a customer performs accounting in a store. The host computer 11 issues a receipt by controlling the printing apparatus 10 according to accounting performed at the checkout counter. The receipt issued by the printing apparatus 10 is handed over to the customer by a person in charge of the checkout counter.

The printing apparatus 10 has a function of accessing the global network GN and communicating with the apparatus connected to the global network GN (including the printing apparatus control server 2a, the management server 2b, and the file providing server 2c). Secure communication is performed between the printing apparatus 10 and the server unit 2 by using a technique related to encryption, such as a virtual private network (VPN), or a technique related to a virtual dedicated line (which may be a physical dedicated line).

A configuration and a function of the printing apparatus 10 will be described later.

Figure 2:
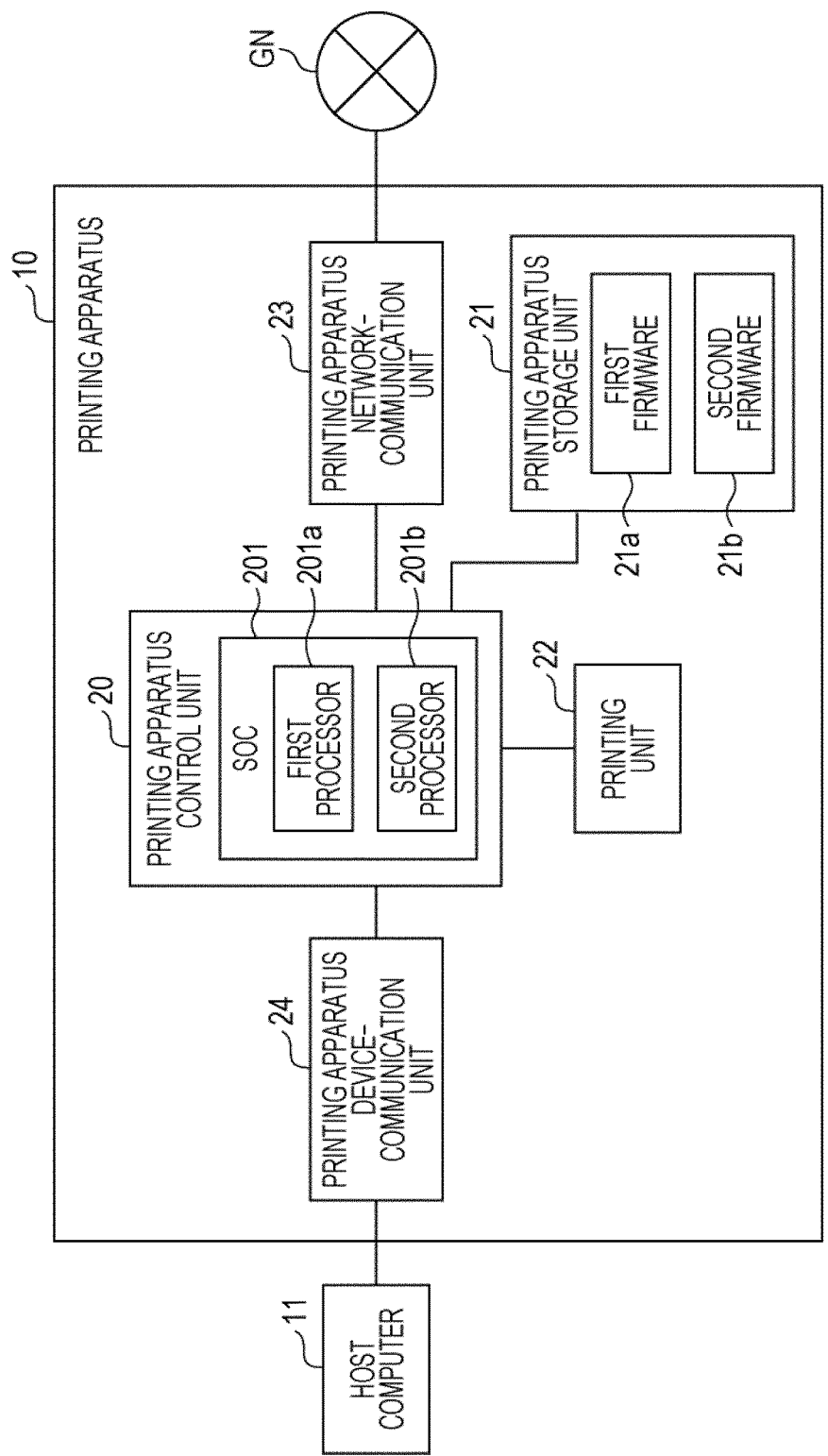
FIG. 2 is a block diagram illustrating a functional configuration of a printing apparatus.

FIG. 2 is a block diagram illustrating a functional configuration of the printing apparatus 10.

The printing apparatus 10 is an apparatus that has a function of accommodating roll paper (print medium), transporting the accommodated roll paper, printing an image on the accommodated roll paper, and cutting the roll paper. A printing method of the printing apparatus 10 may be any one of a thermal method, an ink jet method, and the like.

As illustrated in FIG. 2, the printing apparatus 10 includes a printing apparatus control unit 20, a printing apparatus storage unit 21, a printing unit 22, a printing apparatus network-communication unit 23 (printing apparatus communication unit), and a printing apparatus device-communication unit 24.

The printing apparatus control unit 20 includes an system on a chip (SOC) 201 on which a first processor 201a and a second processor 201b are mounted, a ROM, a RAM, an ASIC, a signal processing circuit, and the like, and controls each unit of the printing apparatus 10.

The printing apparatus storage unit 21 includes a nonvolatile memory, and stores first firmware 21a, second firmware 21b, and other data.

The first firmware 21a is firmware which has at least a function of printing an image by controlling the printing unit 22 to be described and a function of performing communication with the host computer 11 by controlling the printing apparatus device-communication unit 24 to be described. The printing apparatus control unit 20 reads and executes the first firmware 21a by the first processor 201a, and controls the printing unit 22 and the printing apparatus device-communication unit 24 by the function of the first firmware 21a. The second firmware 21b is firmware which has at least a function of communicating with an apparatus connected to the global network GN by controlling the printing apparatus network-communication unit 23 to be described. The printing apparatus control unit 20 reads and executes the second firmware 21b by the second processor 201b, and controls the printing apparatus network-communication unit 23 by the function of the second firmware 21b.

The printing unit 22 has at least a printing mechanism, a transporting mechanism, and a cutting mechanism. The printing mechanism includes a printing head and other elements related to printing. The transporting mechanism includes a transporting roller for transporting the roll paper accommodated in the printing apparatus 10 in a predetermined direction, and other elements related to the transporting of the roll paper. The cutting mechanism includes a cutter for cutting the roll paper and other elements related to the cutting of the roll paper. Under the control of the printing apparatus control unit 20, the printing unit 22 transports the roll paper in a predetermined direction, prints an image on the roll paper by the printing mechanism, and cuts the roll paper at a predetermined position by the cutting mechanism. Thus, a piece of paper on which the image is printed, is issued.

Under the control of the printing apparatus control unit 20, the printing apparatus network-communication unit 23 communicates with an apparatus connected to the global network GN according to a predetermined communication standard. Any communication standard may be used for communication between the printing apparatus 10 and the apparatus connected to the global network GN. The communication standard which is used when the printing apparatus 10 communicates with the printing apparatus control server 2a, the management server 2b, and the file providing server 2c of the server unit 2 will be described later.

The printing apparatus device-communication unit 24 communicates with the host computer 11 according to a predetermined communication standard under the control of the printing apparatus control unit 20. The communication standard which is used for communication between the printing apparatus 10 and the host computer 11 may be a wired communication standard or a wireless communication standard. The wired communication standard is, for example, USB, a serial communication standard such as RS232C other than USB, a parallel communication standard such as IEEE1284, or Ethernet (registered trademark). In addition, the wireless communication standard is, for example, a wireless LAN communication standard such as Wi-Fi (registered trademark), or a near-field communication standard such as Bluetooth (registered trademark).

Figure 3:
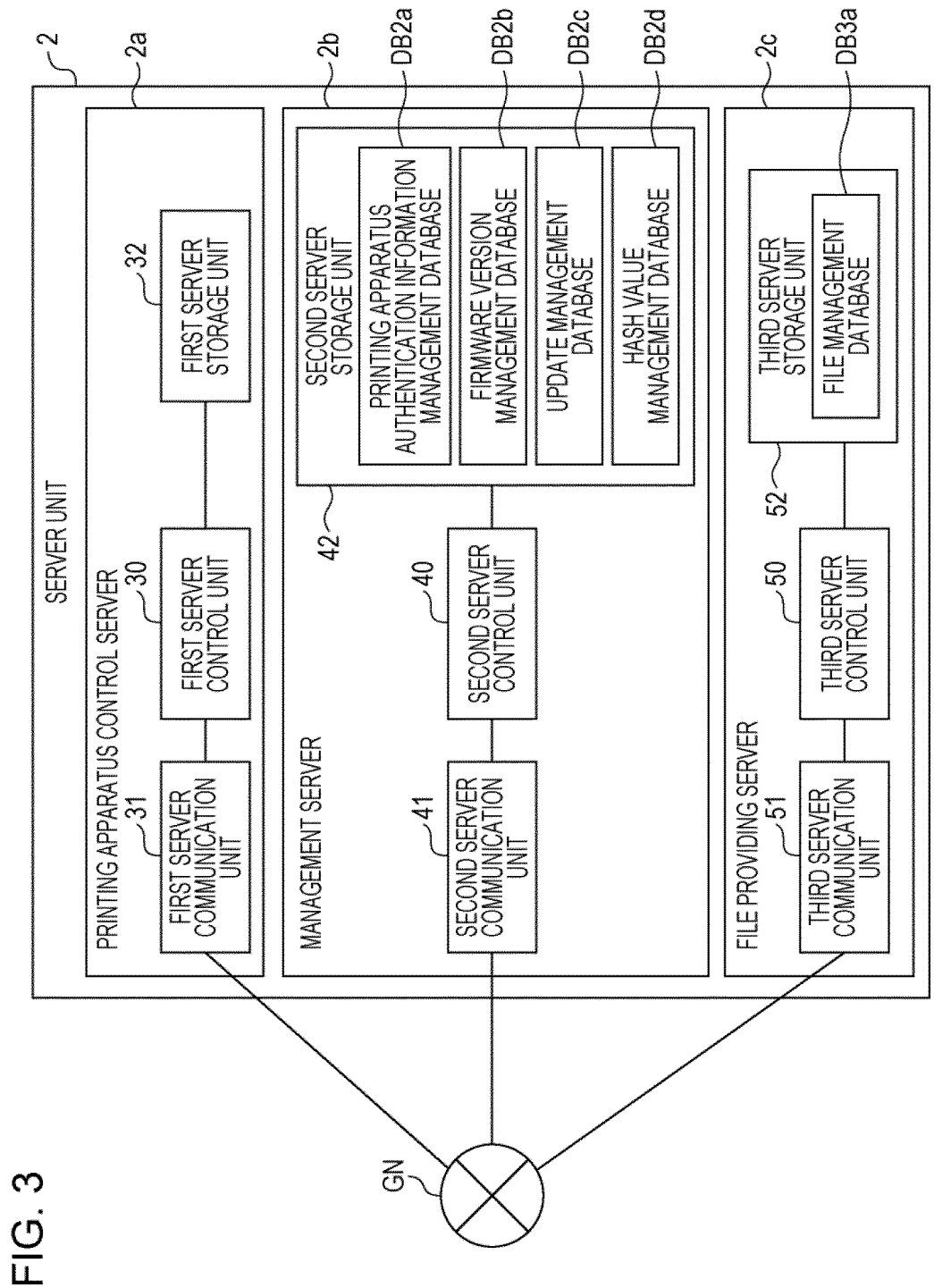
FIG. 3 is a block diagram illustrating a functional configuration of a server unit.

FIG. 3 is a block diagram illustrating functional configurations of the printing apparatus control server 2a, the management server 2b, and the file providing server 2c.

As illustrated in FIG. 3, the printing apparatus control server 2a includes a first server control unit 30, a first server communication unit 31, and a first server storage unit 32.

The first server control unit 30 includes a CPU, a ROM, a RAM, an ASIC, a signal processing circuit, and the like, and controls each unit of the printing apparatus control server 2a.

Under the control of the first server control unit 30, the first server communication unit 31 communicates with an apparatus connected to the global network GN according to the predetermined communication standard.

The first server storage unit 32 includes a nonvolatile memory, and stores various types of data. The data stored in the first server storage unit 32 will be described later.

As illustrated in FIG. 3, the management server 2b includes a second server control unit 40, a second server communication unit 41, and a second server storage unit 42.

The second server control unit 40 includes a CPU, a ROM, a RAM, an ASIC, a signal processing circuit, and the like, and controls each unit of the management server 2b.

Under the control of the second server control unit 40, the second server communication unit 41 communicates with an apparatus connected to the global network GN according to the predetermined communication standard.

The second server storage unit 42 includes a nonvolatile memory, and stores various types of data. The data stored in the second server storage unit 42 will be described later.

As illustrated in FIG. 3, the file providing server 2c includes a third server control unit 50, a third server communication unit 51, and a third server storage unit 52.

The third server control unit 50 includes a CPU, a ROM, a RAM, an ASIC, a signal processing circuit, and the like, and controls each unit of the file providing server 2c.

Under the control of the third server control unit 50, the third server communication unit 51 communicates with an apparatus connected to the global network GN according to the predetermined communication standard.

The third server storage unit 52 includes a nonvolatile memory, and stores various types of data. The data stored in the third server storage unit 52 will be described later.

Next, operations of the printing apparatus 10, the printing apparatus control server 2a, and the management server 2b after the printing apparatus 10 is powered on, will be described.

Figure 4:
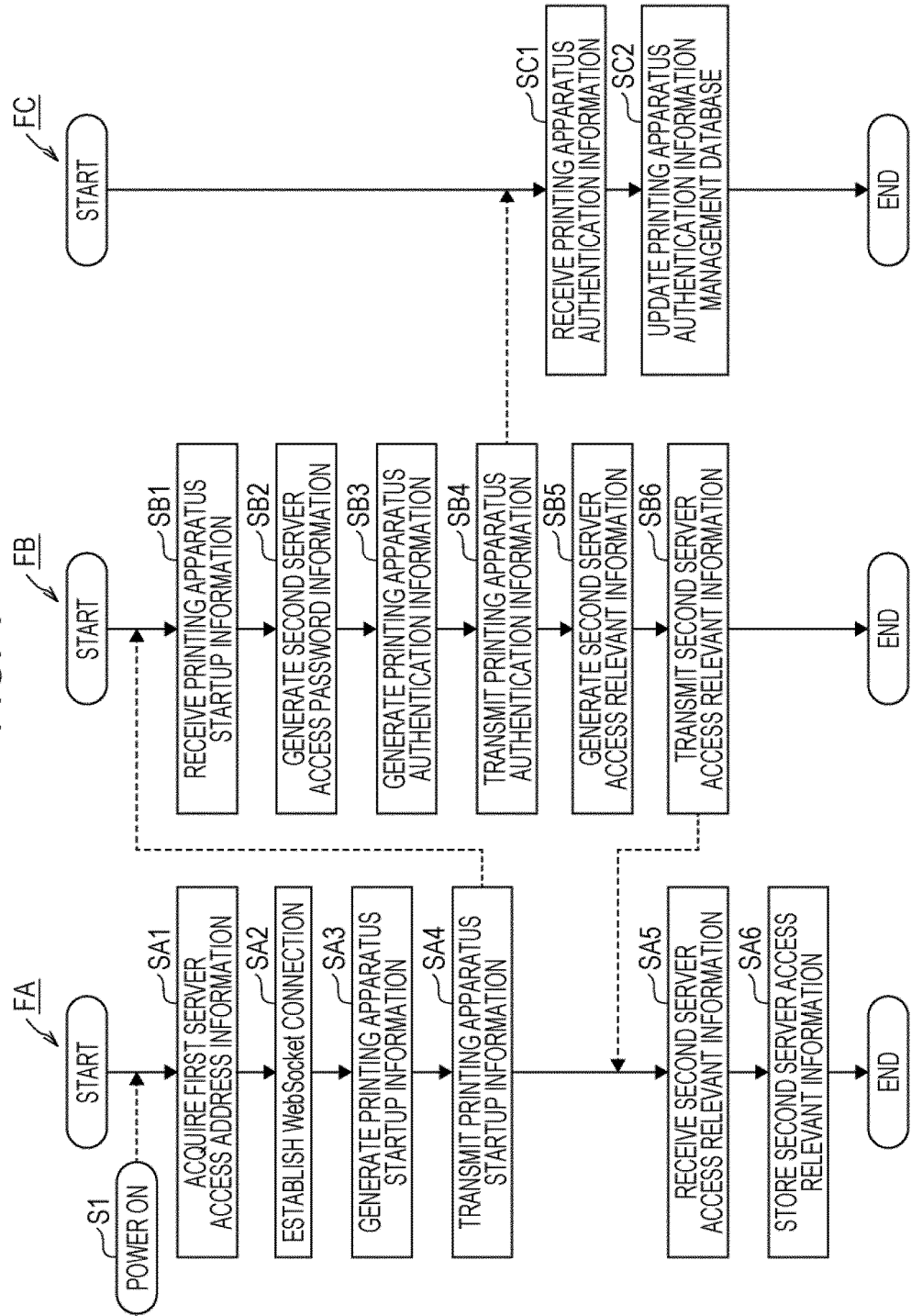
FIG. 4 is a flowchart illustrating operations of the printing apparatus, a printing apparatus control server, and a management server.

FIG. 4 is a flowchart illustrating operations of the printing apparatus 10, the printing apparatus control server 2a, and the management server 2b at the time of startup of the printing apparatus 10 after the printing apparatus 10 is powered on. In FIG. 4, a flowchart FA illustrates operations of the printing apparatus 10, a flowchart FB illustrates operations of the printing apparatus control server 2a, and a flowchart FC illustrates operations of the management server 2b.

For example, in a store provided with the printing apparatus 10, the printing apparatus 10 is powered on by a user at a predetermined timing before the store is open.

As illustrated in the flowchart FA of FIG. 4, when the printing apparatus 10 is powered on (step S1), the printing apparatus control unit 20 of the printing apparatus 10 acquires first server access address information J1 (step SA1). The first server access address information J1 is information indicating an address of the printing apparatus control server 2a. The first server access address information J1 is registered in advance in the printing apparatus 10, and is stored in a predetermined storage area of the printing apparatus storage unit 21.

Next, the printing apparatus control unit 20 accesses the printing apparatus control server 2a according to WebSocket based on the first server access address information J1 by controlling the printing apparatus network-communication unit 23, and establishes a WebSocket connection with the printing apparatus control server 2a (step SA2).

The WebSocket is one communication standard which allows asynchronous bidirectional communication between a server connected via a network (in this example, the printing apparatus control server 2a) and a client (in this example, the printing apparatus 10). The WebSocket connection is a logical communication path for transmitting and receiving data according to a WebSocket protocol and a WebSocket procedure between a server (in this example, the printing apparatus control server 2a) and a client (in this example, the printing apparatus 10), the server and the client being connected to each other by the WebSocket connection.

After the WebSocket connection is established in step SA2, the printing apparatus 10 and the printing apparatus control server 2a perform the asynchronous bidirectional communication (WebSocket communication) via the WebSocket connection.

As described above, when the power is on, the printing apparatus 10 accesses the printing apparatus control server 2a, and establishes the WebSocket connection with the server. Thereby, a state where the printing apparatus 10 and the server can perform asynchronous bidirectional communication, is established.

Although a detailed description is omitted, when establishing the WebSocket connection, authentication of the printing apparatus 10 may be appropriately performed by the printing apparatus control server 2a, and authentication of the printing apparatus control server 2a may be appropriately performed by the printing apparatus 10, based on an existing technology.

In this embodiment, although the WebSocket is used as a communication standard for communication between the printing apparatus 10 and the printing apparatus control server 2a, this is only an example, and another communication standard may be used.

After establishing the WebSocket connection, the printing apparatus control unit 20 generates printing apparatus startup information J2 (step SA3).

The printing apparatus startup information J2 is information including at least printing apparatus identification information J3 and startup notification information J4.

The printing apparatus identification information J3 is identification information for uniquely identifying the printing apparatus 10, and the printing apparatus identification information J3 having a different value is assigned for each printing apparatus 10. As the printing apparatus identification information J3, a serial number which is assigned for the printing apparatus 10 at a manufacturing stage of the printing apparatus 10, can be used. The printing apparatus identification information J3 is registered in advance in the printing apparatus 10, and is stored in a predetermined storage area of the printing apparatus storage unit 21. The startup notification information J4 is information for notifying startup of the printing apparatus 10 by power-on of the printing apparatus 10.

After generating the printing apparatus startup information J2 in step SA3, the printing apparatus control unit 20 transmits the printing apparatus startup information J2 obtained in step SA3 to the printing apparatus control server 2a via the WebSocket connection by controlling the printing apparatus network-communication unit 23 (step SA4).

As illustrated in the flowchart FB of FIG. 4, the first server control unit 30 of the printing apparatus control server 2a receives the printing apparatus startup information J2 by controlling the first server communication unit 31 (step SB1).

Next, the first server control unit 30 generates second server access password information J5 (step SB2).

The second server access password information J5 is information indicating a password which is used when the printing apparatus 10 accesses the management server 2b. As will be described later, when accessing the management server 2b, the printing apparatus 10 notifies the management server 2b of the second server access password information J5. The management server 2b authenticates the printing apparatus 10 as an access source based on the second server access password information J5.

A value of the second server access password information J5 is not a fixed value but a variable value which changes each time the information is generated. In step SB2, the first server control unit 30 generates the second server access password information J5 using a predetermined algorithm.

Next, the first server control unit 30 generates printing apparatus authentication information J6 (step SB3).

The printing apparatus authentication information J6 is information including at least the printing apparatus identification information J3 and the second server access password information J5.

Next, the first server control unit 30 transmits the printing apparatus authentication information J6 generated in step SB3 to the management server 2b by controlling the first server communication unit 31 (step SB4).

As illustrated in the flowchart FC of FIG. 4, the second server control unit 40 of the management server 2b receives the printing apparatus authentication information J6 by controlling the second server communication unit 41 (step SC1).

Next, the second server control unit 40 updates a content of a corresponding record of a printing apparatus authentication information management database DB2a stored in the second server storage unit 42 (step SC2).

The printing apparatus authentication information management database DB2a is a database including records for each printing apparatus 10. Each record of the printing apparatus authentication information management database DB2a includes the printing apparatus identification information J3 and the second server access password information J5.

In step SC2, the second server control unit 40 specifies, from records of the printing apparatus authentication information management database DB2a, a record which includes printing apparatus identification information J3 having the same value as a value of the printing apparatus identification information J3 included in the received printing apparatus authentication information J6. Here, the specified record corresponds to the "corresponding record". Next, the second server control unit 40 updates a value of second server access password information J5 of the specified record with the value of the second server access password information J5 included in the received printing apparatus authentication information J6.

In this embodiment, the management server 2b stores the printing apparatus authentication information management database DB2a, and the management server 2b updates the database. On the other hand, it is not always necessary that the management server 2b stores the printing apparatus authentication information management database DB2a. The printing apparatus authentication information management database DB2a may be in a location that can be referred to by the management server 2b, and the database may be updated by the printing apparatus control server 2a.

As illustrated in the flowchart FB of FIG. 4, after transmitting the printing apparatus authentication information J6 to the management server 2b, the first server control unit 30 generates second server access relevant information J7 (step SB5).

The second server access relevant information J7 is information including at least the second server access password information J5 and second server access address information J8.

The second server access address information J8 is information indicating an address of the management server 2b.

The second server access address information J8 is registered in advance in the printing apparatus control server 2a, and is stored in a predetermined storage area of the first server storage unit 32.

In addition, in a case where the management server 2b is configured to include a plurality of server apparatuses having different addresses from each other, the first server control unit 30 executes the following processing in step SB5. That is, the second server access address information J8 of each of the plurality of server apparatuses constituting the management server 2b is registered in advance in the printing apparatus control server 2a, and is stored in a predetermined storage area of the first server storage unit 32. In step SB5, the first server control unit 30 selects one management server 2b that will be notified of the second server access address information J8 such that accesses are not concentrated on a specific management server 2b, and includes the second server access address information J8 corresponding to the selected management server 2b into the second server access relevant information J7. The printing apparatus 10 accesses the printing apparatus control server 2a when the power is on. Thus, by performing such processing using the access appropriately, it is possible to effectively distribute a load of the management server 2b.

After generating the second server access relevant information J7, the first server control unit 30 transmits the second server access relevant information J7 to the printing apparatus 10 by controlling the first server communication unit 31 (step SB6).

As illustrated in the flowchart FA of FIG. 4, the printing apparatus control unit 20 of the printing apparatus 10 receives the second server access relevant information J7 by controlling the printing apparatus network-communication unit 23 (step SA5).

Next, the printing apparatus control unit 20 stores the received second server access relevant information J7 in a predetermined storage area of the printing apparatus storage unit 21 (step SA6). In a case where stored second server access relevant information J7 already exists in the printing apparatus storage unit 21, in step SA6, the printing apparatus control unit 20 overwrites the existing second server access relevant information J7 with the received second server access relevant information J7, and stores the overwritten second server access relevant information J7.

As described above, when the power is on, the printing apparatus 10 accesses the printing apparatus control server 2a, receives the second server access relevant information J7 from the printing apparatus control server 2a, and stores the received information.

Next, operations of the printing apparatus 10, the management server 2b, and the file providing server 2c during a period for which the printing apparatus 10 is started up and is operated, will be described.

FIGS. 5A and 5B are flowcharts illustrating operations of the printing apparatus 10, the management server 2b, and the file providing server 2c during an operation period of the printing apparatus 10. In FIGS. 5A and 5B, a flowchart FD illustrates operations of the printing apparatus 10, a flowchart FE illustrates operations of the management server 2b, and a flowchart FF illustrates operations of the file providing server 2c.

Here, the operation period of the printing apparatus 10 refers to, for example, a period from a time when the printing apparatus 10 is powered on and is started up to a time when the printing apparatus 10 is powered off and is stopped.

As illustrated in the flowchart FD of FIGS. 5A and 5B, the printing apparatus control unit 20 of the printing apparatus 10 monitors whether or not it is time to transmit periodic printing apparatus information J9 to be described later to the management server 2b (step SD1).

Here, during the operation period, the printing apparatus 10 periodically transmits the periodic printing apparatus information J9 to be described later, to the management server 2b at a predetermined time interval (for example, one hour). In step SD1, in a case where it is detected that the predetermined time interval elapses after previous transmission of the periodic printing apparatus information J9, the printing apparatus control unit 20 determines that it is time to transmit the periodic printing apparatus information J9. When the printing apparatus 10 is powered on, the printing apparatus control unit 20 receives the second server access relevant information J7 from the printing apparatus control server 2a. At this time, in response to the reception of the second server access relevant information J7, the printing apparatus control unit 20 transmits the first periodic printing apparatus information J9.

Information indicating the predetermined time interval at which the printing apparatus 10 transmits the periodic printing apparatus information J9 is registered in advance in the printing apparatus 10, and is stored in a predetermined storage area of the printing apparatus storage unit 21.

In step SD1, in a case where it is determined that it is time to transmit the periodic printing apparatus information J9 (YES in step SD1), the printing apparatus control unit 20 generates the periodic printing apparatus information J9 (step SD2).

The periodic printing apparatus information J9 is information including at least the printing apparatus identification information J3, the second server access password information J5, first firmware version information J10, second firmware version information J11, and printing apparatus model information J12. The periodic printing apparatus information J9 corresponds to "printing apparatus information".

In step SD2, the printing apparatus control unit 20 refers to the second server access relevant information J7 which is stored in the predetermined storage area of the printing apparatus storage unit 21 in step SA6 of the flowchart FA of FIG. 4, acquires the second server access password information J5 included in the second server access relevant information J7, and includes the acquired second server access password information J5 into the periodic printing apparatus information J9.

The first firmware version information J10 is information indicating a version of the first firmware 21a. The first firmware version information J10 is described in a data portion of the first firmware 21a. In step SD2, the printing apparatus control unit 20 refers to the data portion of the first firmware 21a, acquires the first firmware version information J10, and includes the acquired first firmware version information J10 into the periodic printing apparatus information J9.

The second firmware version information J11 is information indicating a version of the second firmware 21b. The second firmware version information J11 is described in a data portion of the second firmware 21b. In step SD2, the printing apparatus control unit 20 refers to the data portion of the second firmware 21b, acquires the second firmware version information J11, and includes the acquired second firmware version information J11 into the periodic printing apparatus information J9.

The printing apparatus model information J12 is information indicating a model of the printing apparatus 10. The printing apparatus model information J12 is registered in advance in the printing apparatus 10, and is stored in a predetermined storage area of the printing apparatus storage unit 21.

After generating the periodic printing apparatus information J9 in step SD2, the printing apparatus control unit 20 executes the following processing (step SD3). That is, the printing apparatus control unit 20 refers to the second server access relevant information J7 stored in the predetermined storage area of the printing apparatus storage unit 21, and acquires the second server access address information J8 included in the second server access relevant information J7. Next, the printing apparatus control unit 20 transmits the generated periodic printing apparatus information J9, to a destination with an address indicated by the acquired second server access address information J8 (address of the management server 2b), by controlling the printing apparatus network-communication unit 23.

In step SD3, according to a hypertext transfer protocol (HTTP), the printing apparatus control unit 20 transmits the periodic printing apparatus information J9 as an HTTP request, to the management server 2b.

Here, as described above, in the store system 3, illegal access from the global network GN to the apparatus connected to the local network LN is prevented by functions of the firewall FW and the proxy server 13 provided in the DMZ segment SG. For this reason, in a situation where connection is not established between the management server 2b and a specific printing apparatus 10 provided in the store system 3, the management server 2b cannot transmit information directly to the specific printing apparatus 10. Based on this fact, between the printing apparatus 10 and the management server 2b, information as an HTTP request is transmitted from the printing apparatus 10 functioning as a client to the management server 2b functioning as a sever, and information as an HTTP response to the HTTP request is transmitted from the management server 2b to the printing apparatus 10. Thus, information is transmitted and received between the printing apparatus 10 and the management server 2b.

As illustrated in the flowchart FE of FIGS. 5A and 5B, the second server control unit 40 of the management server 2b receives the periodic printing apparatus information J9 by controlling the second server communication unit 41 (step SE1).

Next, the second server control unit 40 acquires the printing apparatus identification information J3 and the second server access password information J5 included in the received periodic printing apparatus information J9, and executes authentication processing based on the acquired information (step SE2). The authentication processing is processing of trying to authenticate the printing apparatus 10 as an access source and determining whether or not the authentication is successful.

More specifically, in step SE2, the second server control unit 40 refers to the printing apparatus authentication information management database DB2a, and specifies the corresponding record in the records of the database. Next, the second server control unit 40 determines whether or not a combination of a value of the printing apparatus identification information J3 and a value of the second server access password information J5 in the specified corresponding record matches with a combination of a value of the printing apparatus identification information J3 and a value of the second server access password information J5 included in the received periodic printing apparatus information J9. In a case where it is determined that the combinations match with each other, the second server control unit 40 determines that the authentication of the printing apparatus 10 is successful. In a case where it is determined that the combinations do not match with each other, the second server control unit 40 determines that the authentication of the printing apparatus 10 is failed.

Although a detailed description is omitted, in a case where the authentication of the printing apparatus 10 is failed, the second server control unit 40 executes processing corresponding to the failure of the authentication instead of executing step SE3 and subsequent processes. For example, the second server control unit 40 notifies a person having legitimate authority such as an operator of the management server 2b that the authentication is failed, by using a predetermined method.

In a case where it is determined that the authentication is successful in the authentication processing of step SE2, the second server control unit 40 refers to a firmware version management database DB2b (step SE3). The firmware version management database DB2b is a database for managing the latest firmware version of each of the first firmware 21a and the second firmware 21b, for each model of the printing apparatus 10. The firmware version management database DB2b includes records for each model of the printing apparatus 10. In the firmware version management database DB2b, a record corresponding to one model includes the printing apparatus model information J12 of the one model, the first firmware version information J10 indicating a version of the "latest" first firmware 21a that can be installed in the printing apparatus 10 of the one model, and the second firmware version information J11 indicating a version of the "latest" second firmware 21b that can be installed in the printing apparatus 10 of the one model.

The contents of the firmware version management database DB2b are updated at an appropriate timing by a predetermined method.

Next, the second server control unit 40 determines whether or not a first condition (predetermined condition) is satisfied (step SE4).

The first condition is a condition for the first firmware 21a or the second firmware 21b in that there is a new version of the firmware that is newer than the version of the firmware currently installed in the printing apparatus 10. "There is a new version of the firmware that is newer than the version of the firmware currently installed in the printing apparatus 10" means that the firmware version management database DB2b manages a new version of the firmware which can be installed in the printing apparatus 10 and is newer than the version of the firmware currently installed in the printing apparatus 10. For example, in a case where the first firmware version information J10 is stored in the firmware version management database DB2b in correlation with the printing apparatus model information J12 indicating one model, the first firmware version information J10 indicating a new version of the first firmware 21a that is newer than the version of the first firmware 21a currently installed in one printing apparatus 10 of the one model, there is a new version of the first firmware 21a that is newer than the version of the first firmware 21a currently installed in the one printing apparatus 10.

Processing of step SE4 will be described in detail. The second server control unit 40 acquires the printing apparatus model information J12 included in the periodic printing apparatus information J9 which is received in step SE1. Next, the second server control unit 40 specifies a record which includes printing apparatus model information J12 having the same value as a value of the acquired printing apparatus model information J12. Next, the second server control unit 40 compares a value of the first firmware version information J10 in the specified record with a value of the first firmware version information J10 included in the received periodic printing apparatus information J9, and based on the comparison result, determines whether or not there is a new version of the first firmware 21a that is newer than the version of the first firmware 21a currently installed in the printing apparatus 10. Similarly, the second server control unit 40 compares a value of the second firmware version information J11 in the specified record with a value of the second firmware version information J11 included in the received periodic printing apparatus information J9, and based on the comparison result, determines whether or not there is a new version of the second firmware 21b that is newer than the version of the second firmware 21b currently installed in the printing apparatus 10. For both of the first firmware 21a and the second firmware 21b, in a case where there is not a new version of the firmware that is newer than the version of the firmware currently installed in the printing apparatus 10, the second server control unit 40 determines that the first condition is not satisfied. Otherwise, the second server control unit 40 determines that the first condition is satisfied.

In step SE4, in a case where it is determined that the first condition is not satisfied (NO in step SE4), the second server control unit 40 generates non-execution instruction information J13 including information for instructing non-execution of update of the firmware (step SE5).

Next, the second server control unit 40 transmits the non-execution instruction information J13 as an HTTP response to the printing apparatus 10, by controlling the second server communication unit 41 (step SE6).

In step SE4, in a case where it is determined that the first condition is satisfied (YES in step SE4), the second server control unit 40 refers to update management database DB2c stored in the second server storage unit 42 (step SE7).

The update management database DB2c includes records for each printing apparatus 10. In the update management database DB2c, a record corresponding to one printing apparatus 10 includes the printing apparatus identification information J3 of the one printing apparatus 10, update permission information J14 for the one printing apparatus 10, and update-executable time period information J15 for the one printing apparatus 10.

The update permission information J14 is information indicating whether or not update to a new version of the firmware is permitted in a case where there is a new version of the firmware that is newer than the version of the firmware currently installed in the printing apparatus 10. The update permission information J14 has a value indicating that the update is permitted, or a value indicating that the update is not permitted.

In the following description, the first firmware 21a, which is installed in the printing apparatus 10 when the printing apparatus control unit 20 transmits the periodic printing apparatus information J9 in step SD3, is appropriately referred to as "existing first firmware". Also, at that time, the second firmware 21b, which is installed in the printing apparatus 10, is appropriately referred to as "existing second firmware". The existing first firmware and the existing second firmware are collectively referred to as "existing firmware" in a case where it is not necessary to distinguish the firmware.

In addition, a new version of the first firmware 21a that is newer than the version of the existing first firmware, is appropriately referred to as "new first firmware". Also, a new version of the second firmware 21b that is newer than the version of the existing second firmware, is appropriately referred to as "new second firmware". The new first firmware and the new second firmware are collectively referred to as "new firmware" in a case where it is not necessary to distinguish the firmware.

In a case of update of the existing first firmware, the printing apparatus 10 overwrites the existing first firmware with the new first firmware. Similarly, in a case of update of the existing second firmware, the printing apparatus 10 overwrites the existing second firmware with the new second firmware.

Here, even in a case where there is new firmware that can be installed in the printing apparatus 10, update of the existing firmware to the new firmware may not be permitted in some cases. For example, in a case where an operation test of the new firmware is not completed or a result of the operation test is not normal, it is not appropriate to update the existing firmware with the new firmware. Also, for example, in some cases, there is a contract between users in that the existing firmware of one printing apparatus 10 cannot be updated with the new firmware. Further, for example, there is a case where a user does not want to update the existing firmware with the new firmware.

In a case where it is not permitted to update the existing firmware with the new firmware for one printing apparatus 10, a value of the update permission information J14 of the one printing apparatus 10 is set to a value indicating that update is not permitted. On the other hand, in a case where it is permitted to update the existing firmware with the new firmware for one printing apparatus 10, a value of the update permission information J14 of the one printing apparatus 10 is set to a value indicating that update is permitted.

The update-executable time period information J15 is information indicating a time period during which the printing apparatus 10 can execute processing of updating the existing firmware with the new firmware.

Here, as described above, the printing apparatus 10 is provided at a checkout counter of a store, and issues a receipt according to accounting performed at the checkout counter. Thus, since a time period from an opening time of the store to a closing time of the store affects work to be performed at the store, during the time period, the printing apparatus 10 cannot execute the processing of updating the existing firmware with the new firmware. In addition, in some stores, the printing apparatus 10 may be used for another purpose other than issuing of a receipt. In this case, the time period during which the printing apparatus 10 is used for another purpose is a time period during which the printing apparatus 10 cannot execute the processing of updating the existing firmware with the new firmware. As described above, for each printing apparatus 10, there is a time period during which the printing apparatus 10 can execute printing and a time period during which the printing apparatus 10 cannot execute printing excluding the time period.

For one printing apparatus 10, the update-executable time period information J15 of the one printing apparatus 10 is information indicating a time period during which the one printing apparatus 10 does not execute printing and the one printing apparatus 10 can execute the processing of updating the existing firmware with the new firmware.

In this embodiment, although a case where the printing apparatus 10 is provided at a store and is used for issuing of a receipt is described as an example, a location at which the printing apparatus 10 is provided is not limited to a store, and the use of the printing apparatus 10 is also not limited to issuing of a receipt. Based on this fact, a time period indicated by the update-executable time period information J15 is appropriately determined according to an environment at which the printing apparatus 10 is provided and the use of the printing apparatus 10.

The contents of the update management database DB2c are updated at an appropriate timing by a predetermined method.

After referring to the update management database DB2c in step SE7, the second server control unit 40 determines whether or not a second condition (predetermined condition) is satisfied (step SE8).

The second condition is that the existing firmware of the printing apparatus 10 is permitted to be updated with the new firmware.

In step SE8, the second server control unit 40 specifies, from records of the update management database DB2c referenced in step SE7, a record which includes printing apparatus identification information J3 having the same value as a value of the printing apparatus identification information J3 included in the periodic printing apparatus information J9 received in step SE1. Next, the second server control unit 40 refers to the update permission information J14 included in the specified record. In a case where a value of the update permission information J14 is a value indicating that update is permitted, the second server control unit 40 determines that the second condition is satisfied. On the other hand, in a case where a value of the update permission information J14 is a value indicating that update is not permitted, the second server control unit 40 determines that the second condition is not satisfied.

In step SE8, in a case where it is determined that the second condition is not satisfied (NO in step SE8), the second server control unit 40 executes processing of step SE5 and processing of step SE6.

On the other hand, in step SE8, in a case where it is determined that the second condition is satisfied (YES in step SE8), the second server control unit 40 determines whether or not a third condition is satisfied (step SE9).

The third condition is that the printing apparatus 10 is in the time period during which the printing apparatus 10 can execute the processing of updating the existing firmware with the new firmware.

In step SE9, the second server control unit 40 specifies, from records of the update management database DB2c referenced in step SE7, a record which includes printing apparatus identification information J3 having the same value as a value of the printing apparatus identification information J3 included in the periodic printing apparatus information J9 received in step SE1. Next, the second server control unit 40 refers to the update-executable time period information J15 included in the specified record. In a case where the printing apparatus 10 is in the time period indicated by the update-executable time period information J15, the second server control unit 40 determines that the third condition is satisfied. On the other hand, in a case where the printing apparatus 10 is not in the time period indicated by the update-executable time period information J15, the second server control unit 40 determines that the third condition is not satisfied.

In step SE9, in a case where it is determined that the third condition is not satisfied (NO in step SE9), as illustrated in the flowchart FE of FIGS. 5A and 5B, the second server control unit 40 executes processing of step SE5 and processing of step SE6.

In a case where all of the first condition, the second condition, and the third condition are satisfied, the second server control unit 40 determines that the existing firmware can be updated with the new firmware.

In step SE9, in a case where it is determined that the third condition is satisfied (YES in step SE9), as illustrated in the flowchart FE of FIGS. 5A and 5B, the second server control unit 40 generates random URL information J16 (step SE10).

The random URL information J16 is information indicating a URL (address) of the file providing server 2c which is accessed when the printing apparatus 10 downloads the new firmware from the file providing server 2c.

The random URL information J16 corresponds to "an address which designates a storage location of overwriting firmware".

A value of the random URL information J16 is not a fixed value but a variable value which changes each time the information is generated. In step SE10, the second server control unit 40 executes, for example, the following processing. That is, the second server control unit 40 sets a host name and a path name of a URL indicated by the random URL information J16, to predetermined values. In addition, the second server control unit 40 randomly generates a value, and adds the generated value to the URL indicated by the random URL information J16, as a parameter.

Next, the second server control unit 40 executes the following processing (step SE11). That is, the second server control unit 40 refers to the firmware version management database DB2b, and generates new firmware version notification information J23.

The new firmware version notification information J23 is information that includes new firmware identification information for identifying the new firmware and new firmware version information indicating a version of the new firmware.

Processing of step SE11 will be described in detail. The second server control unit 40 refers to the firmware version management database DB2b. In a case of updating the existing first firmware with the new first firmware, the second server control unit 40 includes a combination of the new first firmware identification information J17 for identifying the new first firmware and the new first firmware version information J18 indicating the version of the new first firmware, into the new firmware version notification information J23. In addition, the second server control unit 40 refers to the firmware version management database DB2b. In a case of updating the existing second firmware with the new second firmware, the second server control unit 40 includes a combination of the new second firmware identification information J20 for identifying the new second firmware and the new second firmware version information J21 indicating the version of the new second firmware, into the new firmware version notification information J23.

Next, the second server control unit 40 generates update relevant information J24 (step SE12).

The update relevant information J24 is information including at least the generated random URL information J16 and the generated new firmware version notification information J23.

Next, the second server control unit 40 transmits the update relevant information J24 to the file providing server 2c by controlling the second server communication unit 41 (step SE13).

As illustrated in the flowchart FF of FIGS. 5A and 5B, the third server control unit 50 of the file providing server 2c receives the update relevant information J24 (step SF1).

Next, the third server control unit 50 stores the update relevant information J24 in a predetermined storage area of the third server storage unit 52 (step SF2). The update relevant information J24 is cumulatively stored in the third server storage unit 52.

As illustrated in the flowchart FE of FIGS. 5A and 5B, the second server control unit 40 of the management server 2b generates update instruction information J25 (step SE14).

The update instruction information J25 is information including at least information for instructing update of the firmware and the generated random URL information J16.

Next, the second server control unit 40 transmits the generated update instruction information J25 as an HTTP response to the printing apparatus 10, by controlling the second server communication unit 41.

As illustrated in the flowchart FD of FIGS. 5A and 5B, the printing apparatus control unit 20 of the printing apparatus 10 receives the non-execution instruction information J13 transmitted by the management server 2b in step SE6, or the update instruction information J25 transmitted by the management server 2b in SE15, by controlling the printing apparatus network-communication unit 23 (step SD4).

Next, the printing apparatus control unit 20 determines whether or not the received information is non-execution instruction information J13 (step SD5).

In a case where the received information is the non-execution instruction information J13 (YES in step SD5), the processing procedure of the printing apparatus control unit 20 transitions to step SD1. In this case, the firmware is not updated.

In a case where the received information is not the non-execution instruction information J13 (NO in step SD5), in other words, in a case where the received information is the update instruction information J25, the printing apparatus control unit 20 executes firmware update processing (step SD6).

Hereinafter, the firmware update processing will be described in detail.

FIG. 6 is a flowchart illustrating operations of the printing apparatus 10, the management server 2b, and the file providing server 2c when the printing apparatus 10 executes the firmware update processing. In FIG. 6, a flowchart FG illustrates operations of the printing apparatus 10, a flowchart FH illustrates operations of the management server 2b, and a flowchart FI illustrates operations of the file providing server 2c.

Processing of the flowchart FG corresponds to the firmware update processing.

In the following description, updating of the existing firmware with the new firmware is expressed as "updating of the firmware" as appropriate. Processing of updating the firmware corresponds to processing of overwriting the firmware.

As illustrated in the flowchart FG of FIG. 6, the printing apparatus control unit 20 of the printing apparatus 10 determines whether or not it is possible to execute processing related to updating of the firmware (step SG1). For example, in a case where printing is being executed, in a case where a cover provided on a housing of the printing apparatus 10 is opened, or in a case where an error occurs in the printing apparatus 10 and thus processing related to updating of the firmware cannot be executed, the printing apparatus control unit 20 determines that the processing related to updating of the firmware cannot be executed.

In a case where the processing related to updating of the firmware cannot be executed (NO in step SG1), the printing apparatus control unit 20 executes corresponding processing (step SG2). For example, in a situation where the printing apparatus control unit 20 transitions from a waiting state to a state in which the processing related to updating of the firmware can be executed, in step SG2, the printing apparatus control unit 20 waits until transition to the state in which the processing related to updating of the firmware can be executed, and then transitions to step SG3. In addition, for example, in a situation where it is uncertain whether or not the printing apparatus control unit 20 transitions from a waiting state to a state in which the processing related to updating of the firmware can be executed, in step SG2, the printing apparatus control unit 20 notifies the management server 2b and other apparatuses of the fact, and notifies a user of the fact by a predetermined method.

In step SG1, in a case where it is determined that the processing related to updating of the firmware can be executed (YES in step SG1), an operation mode of the printing apparatus control unit 20 transitions to a firmware update mode (step SG3). During a period for which the operation mode is the firmware update mode, the printing apparatus control unit 20 prohibits execution of processing that may affect the processing related to updating of the firmware, such as processing related to printing.

Next, the printing apparatus control unit 20 prints information indicating start of firmware update on the roll paper by controlling the printing unit 22 (step SG4).

FIG. 7 is a diagram illustrating an example of information printed on the roll paper in step SG4.

As illustrated in FIG. 7, information indicating that updating of the firmware is started, that a user will be notified when updating of the firmware is completed, and that it is not allowed to turn off the printing apparatus 10 until updating of the firmware is completed, is printed on the roll paper. By visually confirming the information printed on the roll paper, a user can accurately recognize start of firmware update and cautions.

In a case where the printing apparatus 10 does not include a display panel such as a liquid crystal display panel and thus the size of the printing apparatus 10 can be reduced, by performing processing of step SG4 using a printing function of the printing apparatus 10 effectively, it is possible to notify a user of necessary information.

In addition, in a case where the printing apparatus 10 includes a display panel such as a liquid crystal display panel, the information may be displayed on the display panel.

Next, the printing apparatus control unit 20 notifies the management server 2b of information indicating a state in which firmware update can be executed, as an HTTP request, by controlling the printing apparatus network-communication unit 23 (step SG5).

As illustrated in the flowchart FH of FIG. 6, the second server control unit 40 of the management server 2b receives the information transmitted by the printing apparatus 10 in step SG5 by controlling the second server communication unit 41 (step SH1).

Next, the second server control unit 40 refers to a hash value management database DB2d stored in the second server storage unit 42 (step SH2).

The hash value management database DB2d is a database for managing a hash value of each version of firmware for each firmware. The hash value of firmware is a hash value which is obtained from file data of the firmware by using a predetermined hash function. For each version of each firmware, the hash value management database DB2d stores identification information for identifying each version of each firmware, identification information for identifying each version, and the hash value of each version of each firmware, in correlation with each other.

Next, the second server control unit 40 acquires a hash value of the new firmware for updating the existing firmware based on the hash value management database DB2d (step SH3). In step SH3, in a case of updating the existing first firmware with the new first firmware, the second server control unit 40 acquires a hash value of the new first firmware, based on the new first firmware identification information J17 and the new first firmware version information J18. More specifically, the second server control unit 40 acquires the new first firmware identification information J17 of the new first firmware that is included in the new firmware version notification information J23 generated in step SE11 of the flowchart FE of FIGS. 5A and 5B, and acquires the new first firmware version information J18 of the new first firmware based on the firmware version management database DB2b. Next, the second server control unit 40 acquires, from the hash value management database DB2d, a hash value which is correlated with a combination of identification information for identifying firmware having the same value as a value of the acquired new first firmware identification information J17 and identification information for identifying a version having the same value as a value of the acquired first firmware version information J18.

In a case where there is new second firmware for updating the existing second firmware, the second server control unit 40 acquires a hash value of the new second firmware based on the new second firmware identification information J20 and the new second firmware version information J21. The second server control unit 40 acquires the hash value of the new second firmware by the same method as a method of acquiring the hash value of the new first firmware.

Next, the second server control unit 40 acquires a private key (step SH4).

The private key is an encryption key corresponding to a public key encryption method. The private key is registered in advance in the management server 2b, and is stored in a predetermined storage area of the second server storage unit 42. As will be described later, a public key corresponding to the private key stored by the management server 2b is stored in the printing apparatus 10.

Next, the second server control unit 40 generates signature information J26 by encrypting the hash value obtained in step SH3 with the private key (step SH5). In a case where two hash values of the hash value of the new first firmware and the hash value of the new second firmware are acquired in step SH3, in step SH5, the second server control unit 40 generates two pieces of signature information J26 based on each of the hash values.

Next, the second server control unit 40 transmits the one or two pieces of signature information J26 generated in step SH5, as an HTTP response, to the printing apparatus 10, by controlling the second server communication unit 41 (step SH6).

As illustrated in the flowchart FG of FIG. 6, the printing apparatus control unit 20 of the printing apparatus 10 receives the signature information J26 by controlling the printing apparatus network-communication unit 23 (step SG6).

Next, the printing apparatus control unit 20 acquires the public key (step SG7).

The public key is a decryption key corresponding to the public key encryption method. Here, the public key is described in the data portion of the first firmware 21a. In step SG7, the printing apparatus control unit 20 acquires the public key by referring to the data portion of the first firmware 21a.

Next, the printing apparatus control unit 20 generates a hash value by decrypting the signature information J26 received in step SG6 with the public key acquired in step SG7 (step SG8). In step SG8, in a case of receiving the two pieces of signature information J26, the printing apparatus control unit 20 generates a hash value by decrypting each of the two pieces of signature information J26.

Next, the printing apparatus control unit 20 transmits information for requesting transmission of the firmware, as an HTTP request, to the file providing server 2c with a destination address (URL) indicated by the random URL information J16 included in the update instruction information J25 received in step SD4 (step SG9).

As illustrated in the flowchart FI of FIG. 6, the third server control unit 50 of the file providing server 2c receives the information transmitted by the printing apparatus 10 in step SG9 by controlling the third server communication unit 51 (step SI1).

Next, the third server control unit 50 acquires update relevant information J24 corresponding to the URL accessed by the printing apparatus 10, from the update relevant information J24 stored in the predetermined storage area of the third server storage unit 52 (step SI2). As described above, the update relevant information J24 is information including the random URL information J16 and the new firmware version notification information J23. In step SI2, the third server control unit 50 acquires update relevant information J24 which includes random URL information J16 having the same value as a value of the URL accessed by the printing apparatus 10.

As described above, the random URL information J16 is not a fixed value but a variable value which is randomly generated. The random URL information J16 is generated by the management server 2b, and is notified to the printing apparatus 10 and the file providing server 2c. The printing apparatus 10 accesses the file providing server 2c based on the random URL information J16, and thus validity of the printing apparatus 10 as an access source can be ensured.

Next, the third server control unit 50 refers to a file management database DB3a stored in the third server storage unit 52 (step SI3).

The file management database DB3a is a database for storing file data of each version of firmware for each firmware. For each version of each firmware, the file management database DB3a stores identification information for identifying each firmware, identification information for identifying each version, and file data of each version of each firmware, in correlation with each other.

Next, the third server control unit 50 acquires the file data of the new firmware, based on the new firmware version notification information J23 included in the update relevant information J24 acquired in step SI2 and the file management database DB3a referred to in step SI3 (step SI4). As described above, the new firmware version notification information J23 is information that includes new firmware identification information for identifying the new firmware and new firmware version information indicating a version of the new firmware. That is, the new firmware version notification information J23 includes identification information of the new firmware which is used for updating of the existing firmware of the printing apparatus 10, and information indicating a version of the new firmware.

In step SI4, in a case of updating the existing first firmware, the third server control unit 50 acquires file data of the new first firmware which is used for updating of the firmware. In a case of updating the existing second firmware, the third server control unit 50 acquires file data of the new second firmware which is used for updating of the firmware. In a case of updating both of the existing first firmware and the existing second firmware, the third server control unit 50 acquires file data of the new first firmware and file data of the new second firmware.

Next, the third server control unit 50 transmits the file data of the new firmware that is acquired in step SI4, to the printing apparatus 10, by controlling the third server communication unit 51 (step SI5).

The file data of the new firmware that is transmitted in step SI5 corresponds to "overwriting firmware".

As illustrated in the flowchart FG of FIG. 6, the printing apparatus control unit 20 of the printing apparatus 10 receives the file data of the new firmware by controlling the printing apparatus network-communication unit 23 (step SG10).

Next, the printing apparatus control unit 20 generates a hash value based on the file data of the new firmware by using a predetermined hash function (step SG11). In step SG11, in a case where there are two pieces of file data, the printing apparatus control unit 20 generates a hash value for each of the two pieces of file data by using a predetermined hash function.

The predetermined hash function used in step SG11 is the same as the hash function used when generating the hash value stored in the management server 2b. The predetermined hash function is registered in advance in the printing apparatus 10, and is stored in a predetermined storage area of the printing apparatus storage unit 21.

Next, the printing apparatus control unit 20 compares the hash value which is generated by using the public key in step SG8 with the hash value which is generated by using the predetermined hash function in step SG11 (step SG12). In a case where the hash value which is generated by using the public key in step SG8 is the same as the hash value which is generated by using the predetermined hash function in step SG11, it means that the file data of the new firmware received by the printing apparatus 10 from the file providing server 2c is not tampered with (the file data has validity). Processing of step SG12 corresponds to processing of determining the validity of the file data of the new firmware (overwriting firmware).

In particular, in this embodiment, an apparatus as a transmission source of the file data of the new firmware (file providing server 2c) is configured to be separated from an apparatus as a transmission source of the signature information J26 which is used for determining the validity of the file data (management server 2b). With this configuration, as compared with a configuration in which the same apparatus transmits the file data of the new firmware and the signature information J26 to the printing apparatus 10, it is possible to effectively reduce a possibility that a third party may acquire both of the file data and the signature information J26. Accordingly, it is possible to effectively reduce a possibility that a third party decrypts a private key by using both of the file data and the signature information J26. Therefore, the validity of the file data can be accurately determined, and thus it is possible to prevent tampering with the file data.

Next, the printing apparatus control unit 20 determines whether or not the hash value which is generated by using the public key in step SG8 is the same as the hash value which is generated by using the predetermined hash function in step SG11 (step SG13).

In a case where the hash values are not the same (NO in step SG13), the printing apparatus control unit 20 executes corresponding processing, instead of performing firmware update (step SG14). In processing of step SG14, the printing apparatus control unit 20 executes at least the following processing. That is, the printing apparatus control unit 20 prints information indicating that the received file data of the new firmware may be tampered with, on the roll paper, by controlling the printing unit 22. By referring to the information printed on the roll paper, a user can accurately recognize that the file data of the new firmware may be tampered with. In addition, the printing apparatus control unit 20 may notify the management server 2b and other apparatuses that the received file data of the new firmware may be tampered with. Further, in a case where the printing apparatus 10 includes a display panel such as a liquid crystal display panel, the printing apparatus control unit 20 may display information indicating that the received file data of the new firmware may be tampered with, on the display panel.

On the other hand, in a case where the hash values are the same (YES in step SG13), the printing apparatus control unit 20 updates the existing firmware with the file data of the new firmware that is received in step SG10 (step SG15). In step SG15, in a case of receiving the file data of the new first firmware and the file data of the new second firmware, the printing apparatus control unit 20 updates the existing first firmware with the file data of the new first firmware, and updates the existing second firmware with the file data of the new second firmware. In addition, in a case of receiving either one of the file data of the new first firmware and the file data of the new second firmware, the printing apparatus control unit 20 updates the corresponding existing firmware with the received file data.

Here, the printing apparatus 10 according to this embodiment stores two pieces of firmware of the first firmware 21a and the second firmware 21b. As described above, in a situation where updating of one piece of firmware is necessary, only the file data of the one piece of firmware is transmitted from the file providing server 2c to the printing apparatus 10. With this configuration, a data amount of data to be transmitted from the file providing server 2c to the printing apparatus 10 can be reduced. Thus, since the data amount is reduced, it is possible to improve communication efficiency and improve processing efficiency of the firmware update processing in the printing apparatus 10.

Next, the printing apparatus control unit 20 prints information indicating completion of firmware update on the roll paper by controlling the printing unit 22 (step SG16).

FIG. 8 is a diagram illustrating an example of information printed on the roll paper in step SG16.

As illustrated in FIG. 8, information indicating completion of firmware update and information prompting restart of the printing apparatus are printed on the roll paper. By visually confirming the information printed on the roll paper, a user can accurately recognize completion of firmware update and restart of the printing apparatus. In addition, in a case where the printing apparatus 10 includes a display panel such as a liquid crystal display panel, the information may be displayed on the display panel.

Next, the operation mode of the printing apparatus control unit 20 transitions to a normal mode from the firmware update mode (step SG17).

Next, another processing of the printing apparatus 10 will be described.

As described above, the public key which is used for decryption of the signature information J26 is described in the data portion of the first firmware 21a. The printing apparatus control unit 20 permits the public key to be modified by updating of the first firmware 21a, and on the other hand, prohibits the public key from being modified by a method other than updating of the first firmware 21a. Therefore, an external apparatus which is allowed to communicate with the printing apparatus 10 cannot modify the public key by transmitting a control command to the printing apparatus 10. Accordingly, the following effects are obtained. That is, in this embodiment, when performing firmware update, the validity of the file data of the new firmware can be determined. Thus, it is possible to prevent updating of the existing firmware with tampered file data of new firmware. Therefore, the public key modified by firmware update can be regarded as a valid public key. Based on this fact, by permitting the public key to be modified by updating of the first firmware 21a, and on the other hand, prohibiting the public key from being modified by a method other than the updating of the first firmware 21a, it is possible to prevent the public key from being illegally modified.

As described above, the printing apparatus 10 according to this embodiment can be connected to the printing apparatus control server 2a, the management server 2b, and the file providing server 2c of the server unit 2 (server). The printing apparatus 10 includes the printing apparatus network-communication unit 23 that transmits the periodic printing apparatus information J9 (printing apparatus information) to the management server 2b and receives an address which designates a storage location of the file data of the new firmware (overwriting firmware) from the management server 2b in a case where a predetermined condition is satisfied, and the printing apparatus control unit 20 that receives the file data of the new firmware from the file providing server 2c based on the address received by the printing apparatus network-communication unit 23 and executes overwriting (updating) of the firmware.

With this configuration, in a case where the management server 2b determines that the predetermined condition is satisfied, the printing apparatus 10 receives the address which designates the storage location of the file data of the new firmware, receives the file data of the new firmware based on the address, and performs overwriting of the firmware. Thus, in a case where the predetermined condition is not satisfied, it is possible to prevent the printing apparatus 10 from acquiring the address which designates the storage location of the file data of the new firmware. In addition, the management server 2b can control whether or not to permit overwriting of the firmware of the printing apparatus 10, and control an execution timing of processing related to overwriting. That is, according to this embodiment, in the printing apparatus 10 that executes overwriting of the firmware by communication with the server unit 2, overwriting of the firmware can be performed by an appropriate method based on communication with the server unit 2.

In addition, in this embodiment, the periodic printing apparatus information J9 includes the printing apparatus model information J12 (model information indicating a model of a printing apparatus main body), the first firmware version information J10, and the second firmware version information J11 (version information indicating a version of the firmware). Whether or not the predetermined condition is satisfied is determined by the management server 2b based on the information transmitted by the printing apparatus 10.

With this configuration, since the periodic printing apparatus information J9 transmitted by the printing apparatus 10 includes the printing apparatus model information J12, the first firmware version information J10, and the second firmware version information J11, the management server 2b can appropriately determine whether or not overwriting of the firmware of the printing apparatus 10 is necessary, based on the model of the printing apparatus 10 and the version of the existing firmware.

In addition, in this embodiment, the periodic printing apparatus information J9 includes the printing apparatus identification information J3 (identification information of the printing apparatus main body). Whether or not the predetermined condition is satisfied is determined by the management server 2b based on the printing apparatus identification information J3 transmitted by the printing apparatus network-communication unit 23.

With this configuration, since the periodic printing apparatus information J9 transmitted by the printing apparatus 10 includes the printing apparatus identification information J3, by using the printing apparatus identification information J3 of the printing apparatus, the management server 2b can appropriately determine whether or not overwriting of the firmware of the printing apparatus 10 is necessary, based on specific circumstances of the printing apparatus 10.

In this embodiment, whether or not the predetermined condition is satisfied is determined by the management server 2b, based on whether or not overwriting of the firmware by the printing apparatus 10 is permitted.

With this configuration, the management server 2b can appropriately determine whether or not overwriting of the firmware is necessary in the printing apparatus 10, based on whether or not overwriting of the firmware by the printing apparatus 10 is permitted.

In addition, in this embodiment, whether or not the predetermined condition is satisfied is determined, based on whether or not the printing apparatus 10 is in a time period during which overwriting of the firmware can be performed.

With this configuration, the printing apparatus 10 can execute processing related to overwriting of the firmware in the time period during which overwriting of the firmware can be performed.

In addition, in this embodiment, the time period during which overwriting of the firmware can be performed is a time period during which the printing unit 22 does not execute printing on the roll paper (printing medium).

With this configuration, the printing apparatus 10 can execute the processing related to overwriting of the firmware in the time period during which the printing unit 22 does not execute printing on the roll paper.

In addition, in this embodiment, the printing apparatus control unit 20 receives the file data of the new firmware from the file providing server 2c, and determines the validity of the file data, before executing overwriting of the firmware.

With this configuration, in a case where the file data of the new firmware has validity, by performing overwriting of the firmware, for example, it is possible to prevent the firmware from being overwritten with tampered file data.

In addition, in this embodiment, in a case where it is determined that the file data of the new firmware is valid, the printing apparatus control unit 20 executes overwriting of the firmware with the file data. On the other hand, in a case where it is determined that the file data of the new firmware is not valid, the printing apparatus control unit 20 does not execute overwriting of the firmware with the file data.

With this configuration, it is possible to prevent the firmware stored in the printing apparatus 10 from being overwritten with firmware which may be tampered with.

In addition, as described above, in this embodiment, the network system 1 is configured to include the printing apparatus 10 and the server unit 2 (server) that can be connected to the printing apparatus 10. The server unit 2 is configured to include the printing apparatus control server 2a, the management server 2b, and the file providing server 2c. The management server 2b of the server unit 2 receives the periodic printing apparatus information J9 (printing apparatus information) from the printing apparatus 10, and in a case where the predetermined condition is satisfied, transmits the address which designates the storage location of the file data of the new firmware (overwriting firmware) to the printing apparatus 10. In a case where a request of transmission of the file data of the new firmware based on the address is received from the printing apparatus 10, the file providing server 2c of the server unit 2 transmits the file data of the new firmware to the printing apparatus 10.

With this configuration, in a case where the predetermined condition is not satisfied, the server unit 2 can prevent the printing apparatus 10 from acquiring the address which designates the storage location of the file data of the new firmware. In addition, the server unit 2 can control whether or not to permit overwriting of the firmware of the printing apparatus 10, and control an execution timing of processing related to overwriting. That is, according to this embodiment, in the network system 1, the server unit 2 transmits the overwriting firmware of the firmware to the printing apparatus 10, by communicating with the printing apparatus 10. Thus, the server unit 2 can transmit the overwriting firmware to the printing apparatus 10 by using an appropriate method based on communication with the printing apparatus 10.

In addition, in this embodiment, the periodic printing apparatus information J9 includes the printing apparatus model information J12 (model information indicating a model of the printing apparatus 10), the first firmware version information J10, and the second firmware version information J11 (version information indicating a version of the firmware). The management server 2b of the server unit 2 determines whether or not the predetermined condition is satisfied, based on the periodic printing apparatus information J9 received from the printing apparatus 10, and the printing apparatus model information J12, the first firmware version information J10, and the second firmware version information J11, which are stored in the firmware version management database DB2b in correlation with each other.

With this configuration, the management server 2b can appropriately determine whether or not overwriting of the firmware is necessary in the printing apparatus 10, based on the model of the printing apparatus 10 and the version of the existing firmware.

In addition, in this embodiment, the periodic printing apparatus information J9 includes the printing apparatus identification information J3 (identification information for identifying the printing apparatus 10). The management server 2b of the server unit 2 determines whether or not the predetermined condition is satisfied, based on the printing apparatus identification information J3 received from the printing apparatus 10.

With this configuration, the management server 2b can appropriately determine whether or not overwriting of the firmware is necessary in the printing apparatus 10, based on specific circumstances of the printing apparatus 10, using the printing apparatus identification information J3 of the printing apparatus 10.

In addition, in this embodiment, the management server 2b determines whether or not the predetermined condition is satisfied, based on whether or not the printing apparatus 10 is in a time period during which overwriting of the firmware can be performed.

With this configuration, the management server 2b can cause the printing apparatus 10 to execute processing related to overwriting of the firmware in the time period during which overwriting of the firmware can be performed.

In addition, in this embodiment, the time period during which the printing apparatus 10 can execute overwriting of the firmware is a time period during which the printing apparatus 10 does not execute printing.

With this configuration, the management server 2b can cause the printing apparatus 10 to execute processing related to overwriting of the firmware in the time period during which the printing apparatus 10 does not execute printing.

In addition, in this embodiment, the server unit 2 is configured to include the printing apparatus control server 2a (first server), the management server 2b (second server), and the file providing server 2c (third server). The printing apparatus control server 2a transmits an address of the management server 2b according to the access from the printing apparatus 10. In a case where the predetermined condition is satisfied, the management server 2b transmits the random URL information J16 (an address which designates the storage location of the overwriting firmware in the file providing server 2c), based on the access from the printing apparatus 10. The file providing server 2c transmits the file data of the new firmware to the printing apparatus 10, based on the access from the printing apparatus 10.

With this configuration, based on the fact that the server unit 2 is configured to include the printing apparatus control server 2a, the management server 2b, and the file providing server 2c, by allocating functions to each server, it is possible to distribute the load of each server and reduce the data amount of data stored in each server.

In addition, in this embodiment, the printing apparatus control server 2a generates the second server access password information J5 (password used when the printing apparatus 10 accesses the management server 2b), and transmits the generated information to the printing apparatus 10 and the management server 2b.

With this configuration, the management server 2b can authenticate the printing apparatus 10, based on the second server access password information J5 generated by the printing apparatus control server 2a.

In addition, in this embodiment, the management server 2b randomly generates the URL of the file providing server 2c that is indicated by the random URL information J16 (address which designates the storage location of the overwriting firmware), and transmits the generated URL to the printing apparatus 10 and the file providing server 2c.

With this configuration, it is possible to prevent an apparatus other than the valid printing apparatus 10 that receives the random URL information J16, from accessing the file providing server 2c and acquiring the file data of the new firmware.

As described above, the network system 1 according to this embodiment is configured to include the printing apparatus 10, the management server 2b that can communicate with the printing apparatus 10, and the file providing server 2c that can communicate with the printing apparatus 10. The printing apparatus 10 includes the printing apparatus storage unit 21 that stores firmware to which a public key is added, the public key being information related to a public key encryption method. The printing apparatus 10 includes the printing apparatus network-communication unit 23 (printing apparatus communication unit) that receives the signature information J26 obtained by encrypting the hash value of the file data of the new firmware with the private key corresponding to the public key, from the management server 2b, and that receives the file data from the file providing server 2c. The printing apparatus 10 includes the printing apparatus control unit 20 which determines the validity of the file data by comparing the hash value generated by decrypting the signature information J26, which is received from the management server 2b by the printing apparatus network-communication unit 23, with the public key stored in the printing apparatus storage unit 21, and the hash value of the file data of the new firmware that is received from the file providing server 2c by the printing apparatus network-communication unit 23.

With this configuration, an apparatus as a transmission source of the file data of the new firmware (file providing server 2c) is different from an apparatus as a transmission source of the signature information J26 which is used for determining the validity of the file data (management server 2b). Accordingly, a possibility that a third party acquires both of the file data and the signature information J26, can be effectively reduced. Thus, it is possible to effectively reduce a possibility that a third party decrypts the private key by using both of the file data and the signature information J26. Therefore, the printing apparatus 10 can accurately determine the validity of the file data. That is, with this configuration, in the network system 1 including the printing apparatus 10 which executes overwriting of the firmware with the file data of the new firmware that is received from the server, the printing apparatus 10 can accurately determine the validity of the file data of the new firmware by using characteristics of the configuration of the server which communicates with the printing apparatus 10.

In addition, in this embodiment, in a case where it is determined that the file data of the new firmware has validity, the printing apparatus control unit 20 executes overwriting of the firmware with the file data, and in a case where it is determined that the file data of the new firmware does not have validity, the printing apparatus control unit 20 does not execute overwriting of the firmware with the file data.

With this configuration, it is possible to prevent the firmware stored in the printing apparatus 10 from being overwritten with firmware which may be tampered with.

In addition, in this embodiment, the printing apparatus control unit 20 determines that the file data has validity, in a case where the hash value generated by decrypting the signature information J26, which is received from the management server 2b by the printing apparatus network-communication unit 23, with the public key stored in the printing apparatus storage unit 21, and the hash value of the file data of the new firmware that is received from the file providing server 2c by the printing apparatus network-communication unit 23, are the same.

With this configuration, the printing apparatus 10 can accurately determine the validity of the file data of the new firmware.

In addition, in this embodiment, in a case where it is determined that the file data of the new firmware does not have validity, the printing apparatus control unit 20 prints information indicating that the file data may be tampered with, on the roll paper (printing medium), by controlling the printing unit 22.

With this configuration, by visually confirming the information printed on the roll paper, a user can accurately recognize that the file data of the new firmware may be tampered with.

In addition, in this embodiment, for the public key stored in the printing apparatus storage unit 21, the printing apparatus control unit 20 permits modification of the public key by overwriting of the firmware, and on the other hand, prohibits modification of the public key by another method.

With this configuration, it is possible to prevent the public key from being illegally modified.

The above-described embodiment has been presented by way of example of the aspect of the invention, and can be arbitrarily modified and applied within the scope of the invention.

For example, in the above-described embodiment, although a case where the printing apparatus 10 is applied to a store is described as an example, a facility to which the store system 3 is applied is not limited to a store.

In addition, each functional block described with reference to the drawings can be arbitrarily realized by hardware and software, and does not suggest a specific hardware configuration.

The entire disclosure of Japanese Patent Application No. 2016-191721, filed Sep. 29, 2016 is expressly incorporated by reference herein.

What is claimed is:

1. A network system comprising:
   a printing apparatus; and
   a first server configured to connect, based on a Web Socket protocol, to the printing apparatus via a fire wall;
   a second server configured to connect, based on a hypertext transfer protocol, to the printing apparatus via the fire wall; and
   a third server configured to transmit overwriting firmware to the printing apparatus via the fire wall,
   wherein the printing apparatus transmits printing apparatus information to the first server,
   wherein the first server receives the printing apparatus information from the printing apparatus, generates a second server access relevant information including an address of the second server, and transmits the second server access relevant information to the printing apparatus,
   wherein the printing apparatus receives the second server access relevant information from the first server, and transmits, based on the address of the second server, the printing apparatus information to the second server,
   wherein the second server receives the printing apparatus information from the printing apparatus, generates update instruction information including a random Uniform Resource Locator (URL) which designates a storage location of the overwriting firmware in a case where a predetermined condition is satisfied, and transmits the update instruction information to the printing apparatus,
   wherein the printing apparatus receives the update information, and transmits a request of transmission of the overwriting firmware to the third server based on the random URL,
   wherein the third server receives a request of transmission of the overwriting firmware from the printing apparatus based on the random URL, and transmits the overwriting firmware to the printing apparatus,
   wherein the second server generates non-execution instruction information which instructs non-execution of update of a firmware in a case where the predetermined condition is not satisfied, and transmits the non-execution instruction information to the printing apparatus, and
   wherein the first server, the second server, and the third server overcome the fire wall with the printing apparatus information received from the printing apparatus.

2. The server according to claim 1,
   wherein the first server, the second server, and the third server are configured to connect to a global network which connects to a local network for the printing apparatus via the fire wall.

3. The network system according to claim 1,
   wherein the printing apparatus information includes model information indicating a model of the printing apparatus and version information indicating a version of the firmware, and
   wherein the second server determines whether or not the predetermined condition is satisfied based on the model information and the version information which are received from the printing apparatus.

4. The network system according to claim 1,
   wherein the printing apparatus information includes identification information for identifying the printing apparatus, and
   wherein the second server determines whether or not the predetermined condition is satisfied based on the identification information received from the printing apparatus.

5. The network system according to claim 1,
   wherein the second server determines whether or not the predetermined condition is satisfied, based on whether or not the printing apparatus is in a time period during which the printing apparatus can execute overwriting of the firmware.

6. The network system according to claim 5,
   wherein the time period during which the printing apparatus can execute overwriting of the firmware is a time period except for a time period from an opening time of a store to a closing time of the store.

* * * * *